United States Patent
Hamada et al.

(10) Patent No.: US 11,392,683 B2
(45) Date of Patent: Jul. 19, 2022

(54) DETECTION DEVICE, DETECTION METHOD AND RECORDING MEDIUM

(71) Applicants: Sumitomo Electric Industries, Ltd., Osaka (JP); AutoNetworks Technologies, Ltd., Yokkaichi (JP); Sumitomo Wiring Systems, Ltd., Yokkaichi (JP)

(72) Inventors: Yoshihiro Hamada, Osaka (JP); Satoshi Horihata, Osaka (JP)

(73) Assignees: SUMITOMO ELECTRIC INDUSTRIES, LTD., Osaka (JP); AUTONETWORKS TECHNOLOGIES, LTD., Yokkaichi (JP); SUMITOMO WIRING SYSTEMS, LTD., Yokkaichi (JP)

( * ) Notice: Subject to any disclaimer, the term of this patent is extended or adjusted under 35 U.S.C. 154(b) by 548 days.

(21) Appl. No.: 16/461,471

(22) PCT Filed: Jul. 5, 2017

(86) PCT No.: PCT/JP2017/024633
§ 371 (c)(1),
(2) Date: May 16, 2019

(87) PCT Pub. No.: WO2018/100783
PCT Pub. Date: Jun. 7, 2018

(65) Prior Publication Data
US 2019/0347402 A1    Nov. 14, 2019

(30) Foreign Application Priority Data

Dec. 1, 2016    (JP) .............................. JP2016-234083

(51) Int. Cl.
*G06F 21/44*    (2013.01)
*G06N 5/02*    (2006.01)
(Continued)

(52) U.S. Cl.
CPC .......... *G06F 21/44* (2013.01); *B60R 16/0231* (2013.01); *G06N 5/02* (2013.01); *H04L 63/08* (2013.01)

(58) Field of Classification Search
CPC .......... G06N 20/10; G06N 5/02; G06F 21/44; B60R 16/0231; H04L 12/28; H04L 63/08
(Continued)

(56) References Cited

U.S. PATENT DOCUMENTS 9,165,131 B1 * 10/2015 Kowalick ............... G06F 21/34
2016/0371618 A1 * 12/2016 Leidner ............... G06F 16/2246
(Continued)

FOREIGN PATENT DOCUMENTS

JP    2005-316779 A    11/2005
JP    2010-92424 A    4/2010
(Continued)

OTHER PUBLICATIONS

Google Patents Translation of Japanese Patent Document JP 2010-092424 (Year: 2010).*

*Primary Examiner* — Benjamin A Kaplan
(74) *Attorney, Agent, or Firm* — Faegre Drinker Biddle & Reath LLP

(57) ABSTRACT

A detection device that detects unauthorized communication in an on-vehicle network mounted on a vehicle includes: a monitoring unit that monitors first information that indicates a state or control related to the vehicle and that is transmitted in the on-vehicle network; a prediction unit that predicts an occurrence of second information in the on-vehicle network that indicates the state or control related to the vehicle based on the first information monitored by the monitoring unit; and a determination unit that determines, in a case where the second information is transmitted in the on-vehicle network, whether or not the transmitted second information is unau- (Continued)

thorized, based on a result of prediction performed by the prediction unit.

9 Claims, 10 Drawing Sheets

(51) Int. Cl.
*B60R 16/023* (2006.01)
*H04L 9/40* (2022.01)

(58) Field of Classification Search
USPC .......................................................... 726/26
See application file for complete search history.

(56) References Cited

U.S. PATENT DOCUMENTS

| | | | |
|---|---|---|---|
| 2018/0144119 A1 | 5/2018 | Kishikawa et al. | |
| 2018/0367546 A1* | 12/2018 | Miyashita | H04L 12/4625 |

FOREIGN PATENT DOCUMENTS

| | | |
|---|---|---|
| JP | 2014-027509 A | 2/2014 |
| JP | 2015-136107 A | 7/2015 |
| JP | 2016-97879 A | 5/2016 |
| JP | 2016-116075 A | 6/2016 |
| JP | 2016-134913 A | 7/2016 |
| JP | 2017-050841 A | 3/2017 |

* cited by examiner

DETECTION DEVICE, DETECTION METHOD AND RECORDING MEDIUM

CROSS-REFERENCE TO RELATED APPLICATIONS

This application is the national phase under 35 U.S.C. § 371 of PCT International Application No. PCT/JP2017/024633 which has an International filing date of Jul. 5, 2017 and designated the United States of America.

FIELD

The present invention relates to a detection device, a detection method and a recording medium.

The present application claims the benefit of priority based on Japanese Patent Application No. 2016-234083 filed on Dec. 1, 2016, the entire contents of which are incorporated herein by reference.

BACKGROUND

Japanese Patent Application Laid-Open Publication No. 2016-116075 discloses an on-vehicle communication system as described below.

The on-vehicle communication system performing message authentication using a transmission side code which is a message authentication code generated by the transmission side of communication data and a reception side code which is a message authentication code generated by the reception side of the communication data, includes: a first ECU that is connected to an on-vehicle network and that holds only a first cipher key of the first cipher key and a second cipher key different from the first cipher key; a second ECU that is connected to the on-vehicle network and that holds at least the first cipher key; and a third ECU that is connected to the on-vehicle network and to a network outside a vehicle, that holds only the second cipher key of the first cipher key and second cipher key, and that generates the transmission side code or the reception side code in the on-vehicle network using the second cipher key. The second ECU transmits communication data to which a transmission side code generated using the first cipher key is added. The first ECU, in the case of having received the communication data, verifies a transmission side code added to the received communication data based on a reception side code generated using the first cipher key.

SUMMARY (1) A detection device according to the present disclosure that detects unauthorized communication in an on-vehicle network mounted on a vehicle includes: a monitoring unit that monitors first information that indicates a state or control related to the vehicle and that is transmitted in the on-vehicle network; a prediction unit that predicts an occurrence of second information in the on-vehicle network that indicates the state or control related to the vehicle based on the first information monitored by the monitoring unit; and a determination unit that determines, in a case where the second information is transmitted in the on-vehicle network, whether or not the transmitted second information is unauthorized based on a result of prediction performed by the prediction unit.

(6) A detection method according to the present disclosure employed in a detection device that detects unauthorized communication in an on-vehicle network mounted on a vehicle includes the steps of: monitoring first information that indicates a state or control related to the vehicle and that is transmitted in the on-vehicle network; predicting an occurrence of second information in the on-vehicle network that indicates the state or control related to the vehicle based on the first information that has been monitored; and determining, in a case where the second information is transmitted in the on-vehicle network, whether or not the transmitted second information is unauthorized based on a result of predicting.

(7) A computer readable non-transitory recording medium recording a detection program according to the present disclosure employed in a detection device that detects unauthorized communication in an on-vehicle network mounted on a vehicle causes a computer to function as: a monitoring unit that monitors first information that indicates a state or control related to the vehicle and that is transmitted in the on-vehicle network; a prediction unit that predicts an occurrence of second information in the on-vehicle network that indicates the state or control related to the vehicle based on the first information monitored by the monitoring unit; a determination unit that determines, in a case where the second information is transmitted in the on-vehicle network, whether or not the transmitted second information is unauthorized based on a result of prediction performed by the prediction unit.

An aspect of the present disclosure may not only be achieved as a detection device provided with such characteristic processing units, but also be achieved as an on-vehicle detection system provided with a detection device. An aspect of the present disclosure may further be achieved as a semiconductor integrated circuit that implements a part or whole of a detection device.

The above and further objects and features of the invention will more fully be apparent from the following detailed description with accompanying drawings.

Figure 1:
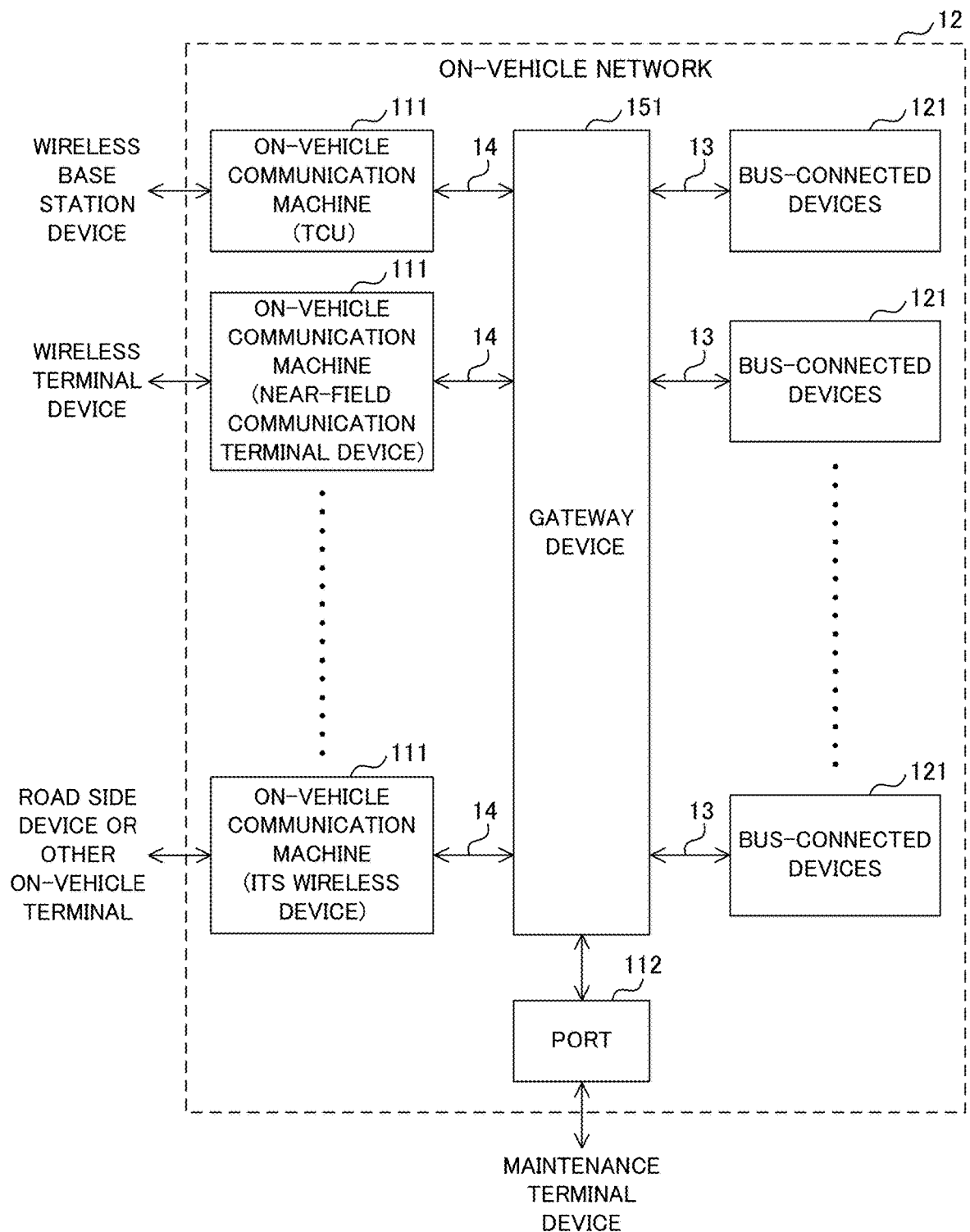
FIG. 1 illustrates the configuration of an on-vehicle detection system according to an embodiment of the present invention.

Conventionally, an on-vehicle network system for improving security in an on-vehicle network has been developed.

Japanese Patent Application Laid-Open Publication No. 2016-116075 discloses a configuration for preventing cyber-attack from an out-of-vehicle network to the first ECU and the second ECU not connected to an out-of-vehicle network by differentiating a first cypher key used in message authentication by the first ECU and the second ECU connected only within an on-vehicle network from a second cypher key used by a third ECU connected to both the on-vehicle network and out-of-vehicle network.

Security measures using message authentication may, however, be disabled by attack to vulnerable protocols, attack by illicit acquisition of the first cypher key, attack to obsolescent cryptographic algorithms, and so forth.

To address this, a technique is thus desired for correctly detecting that an attacker has intruded into an on-vehicle network.

The present disclosure has been made in view of the problem described above, and aims to provide a detection device, a detection method and a detection program that are capable of correctly detecting unauthorized communication in the on-vehicle network.

According to the present disclosure, unauthorized communication in the on-vehicle network may correctly be detected.

First, embodiments of the present invention will be listed in the following description.

(1) A detection device according to an embodiment of the present invention that detects unauthorized communication in an on-vehicle network mounted on a vehicle includes: a monitoring unit that monitors first information that indicates a state or control related to the vehicle and that is transmitted in the on-vehicle network; a prediction unit that predicts an occurrence of second information in the on-vehicle network that indicates the state or control related to the vehicle based on the first information monitored by the monitoring unit; and a determination unit that determines, in a case where the second information is transmitted in the on-vehicle network, whether or not the transmitted second information is unauthorized based on a result of prediction performed by the prediction unit.

Accordingly, the configuration where the occurrence of the second information is predicted based on the first information in the on-vehicle network may, for example, obtain a period during which the second information highly likely occurs, which allows for determination on the second information occurring in a period different from the above-described period as unauthorized. This can correctly detect unauthorized communication in the on-vehicle network.

(2) Preferably, the first information and the second information have causes of occurrence different from each other.

According to such a configuration, the number of combinations of the first information and the second information may be increased compared to the case where the first information and the second information have the same cause of occurrence, which can enhance the ability of extracting a combination of the first and second information that is more suitable to the detection of unauthorized communication.

(3) Preferably, the monitoring unit monitors multiple kinds of first information, and the determination unit uses the prediction result based on the multiple kinds of first information monitored by the monitoring unit to determine if one kind of second information is unauthorized.

Such a configuration can enhance the accuracy in prediction of an occurrence of the second information because the occurrence of the second information is predictable based on the result of sensing the behavior of the user or a vehicle in various ways.

(4) Preferably, the prediction unit predicts an occurrence of the second information on the basis of determination reference information created based on the history of the first information occurring when the second information is transmitted in the on-vehicle network and of the first information monitored by the monitoring unit.

Such a configuration can enhance the accuracy in prediction of the occurrence of the second information because the occurrence of the second information is predictable from a change in time series of the first information.

(5) Preferably, the prediction unit predicts the occurrence of the second information based on the content of the first information monitored by the monitoring unit.

Such a configuration can enhance the accuracy in prediction of the occurrence of the second information because the occurrence of the second information in correlation to a behavior of the user or vehicle represented by the first information may be predicted based on the details of the behavior.

(6) A detection method according to an embodiment of the present invention employed in a detection device that detects unauthorized communication in an on-vehicle network mounted on a vehicle includes the steps of; monitoring first information that indicates a state or control related to the vehicle and that is transmitted in the on-vehicle network; predicting an occurrence of second information in the on-vehicle network that indicates the state or control related to the vehicle based on the first information monitored; and determining, in a case where the second information is transmitted in the on-vehicle network, whether or not the transmitted second information is unauthorized based on a result of prediction.

According to such a configuration where the occurrence of the second information is predicted based on the first information in the on-vehicle network, for example, a period during which the second information is likely to occur may be obtained, which can thus determine that the second information occurring in a period different from the above-described period is unauthorized. This allows for correct detection of unauthorized communication in the on-vehicle network.

(7) A computer readable non-transitory recording medium recording a detection program according to an embodiment of the present invention used in a detection device that detects unauthorized communication in an on-vehicle network mounted on a vehicle causes a computer to function as: a monitoring unit that monitors first information that indicates a state or control related to the vehicle and that is transmitted in the on-vehicle network; a prediction unit that predicts an occurrence of second information in the on-vehicle network that indicates the state or control related to the vehicle based on the first information monitored by the monitoring unit; and a determination unit that determines, in a case where the second information is transmitted in the on-vehicle network, whether or not the transmitted second information is unauthorized based on a result of prediction performed by the prediction unit.

Accordingly, the configuration where the occurrence of the second information is predicted based on the first information in the on-vehicle network may, for example, obtain a period during which the second information highly likely occurs, which allows for determination on the second information occurring in a period different from the above-described period as unauthorized. This allows for correct detection of unauthorized communication in an on-vehicle network.

Embodiments of the present invention will be described below with reference to the drawings. Same or corresponding parts in the drawings are denoted by the same reference codes and the description thereof will not be repeated. At least parts of the embodiments described below may arbitrarily be combined together.

Configuration and Basic Operation

FIG. 1 illustrates the configuration of an on-vehicle detection system according to an embodiment of the present invention.

Referring to FIG. 1, the on-vehicle detection system 301 includes a gateway device 151, more than one on-vehicle communication machines 111 and a group of bus-connected devices 121.

Figure 2:
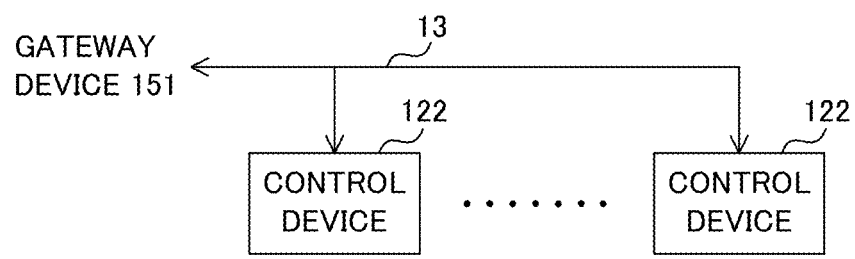
FIG. 2 illustrates the configuration of a group of bus-connected devices according to an embodiment of the present invention.

FIG. 2 illustrates the configuration of a group of bus-connected devices according to an embodiment of the present invention.

Referring to FIG. 2, the bus-connected devices 121 include multiple control devices 122. Note that the but-connected devices 121 may be configured to include one control device 122, not limited to the configuration including multiple control devices 122.

The vehicle detection system 301 is mounted to a vehicle running on a road (hereinafter also referred to as a target vehicle). The on-vehicle network 12 is mounted to a target vehicle, and includes more than one on-vehicle devices located inside the target vehicle. Specifically, the on-vehicle network 12 includes multiple on-vehicle communication machines 111 and multiple control devices 122 that are examples of the on-vehicle devices. The on-vehicle network 12 is configured to include multiple on-vehicle devices in any combination. That is, it may include multiple on-vehicle communication machines 111 but no control devices 122, or may include multiple control devices 122 but no on-vehicle communication machines 111, or may include one on-vehicle communication machine 111 and one control device 122.

In the on-vehicle network 12, the on-vehicle communication machine 111 communicates with, for example, a device outside a target vehicle. More specifically, the on-vehicle communication machine 111 is, for example, a telematics communication unit (TCU), a near field communication (NFC) terminal device and an intelligent transport systems (ITS) wireless device.

The TCU is able to wirelessly communicate with a wireless base station device and to communicate with the gateway device 151 according to a communication protocol such as Long Term Evolution (LTE) or 3G, for example. The TCU relays information used in services such as navigation, vehicle theft protection, remote maintenance and Firmware Over the Air (FOTA).

The NFC terminal device is able to wirelessly communicate with a wireless terminal device such as a smartphone held by a person in a target vehicle (hereinafter also referred to as a target person) and to communicate with the gateway device 151 according to a communication protocol such as Wi-Fi (registered trademark) and Bluetooth (registered trademark), for example. The NFC terminal device relays, for example, information used for services of entertainment or the like.

Moreover, the NFC terminal device is able to wirelessly communicate with a wireless terminal device such as a smart key held by a target person and a wireless terminal device located at a tire using radio wave in a low frequency (LF) band or ultra-high frequency (UHF) band, and also to communicate with the gateway device 151. The NFC terminal device relays, for example, information used for services of smart entry, tire pressure monitoring system (TPMS) and so forth.

The ITS wireless device is able to perform road-to-vehicle communication with road side devices such as optical beacon, radiowave beacon and ITS spot, for example, located in the vicinity of a road, to perform vehicle-to-vehicle communication with an on-vehicle terminal mounted to another vehicle, and to communicate with the gateway device 151. The ITS wireless device relays, for example, information used for services of congestion alleviation, safe driving assistance, route guidance or the like.

The gateway device 151 is able to transmit or receive data concerning updating of a firmware, data accumulated by the gateway device 151, and the like to/from a maintenance terminal device outside a target vehicle via a port 112.

The gateway device 151 is connected to an on-vehicle device via the buses 13 and 14, for example. More specifically, the buses 13 and 14 are buses according to a protocol such as Controller Area Network (CAN, registered trademark), FlexRay (registered trademark), Media Oriented Systems Transport (MOST, registered trademark), the Ethernet (registered trademark) and Local Interconnect Network (LIN).

In this example, the on-vehicle communication machine 111 is connected to the gateway device 151 via the corresponding bus 14 according to the Ethernet protocol. Moreover, each control device 122 in the bus-connected devices 121 is connected to the gateway device 151 via the corresponding bus 13 according to the CAN protocol. The control device 122 is capable of controlling, for example, a functional part in a target vehicle.

The bus 13 is provided for each system, for example. More specifically, the buses 13 include, for example, a drive-related bus, a chassis/safety-related bus, a body/electric equipment-related bus and an AV/information-related bus.

The drive-related bus is connected to an engine control device, an automatic transmission (AT) control device and a hybrid electric vehicle (HEV) control device that are examples of the control device 122. The engine control device, AT control device and HEV control device control the engine, the AT and the switching between engine and motor, respectively.

The chassis/safety-related bus is connected to a brake control device, a chassis control device and a steering control device that are examples of the control device 122. The brake control device, chassis control device and steering control device control the brake, chassis and steering, respectively.

The body/electric equipment-related bus is connected to an instrument display control device, an air conditioner control device, a theft protection control device, an airbag control device and a smart entry control device that are examples of the control device 122. The instrument display control device, air conditioner control device, theft protection control device, airbag control device and smart entry control device control an instrument, an air conditioner, a theft protection mechanism, an airbag mechanism and smart entry, respectively.

The AV/information-related bus is connected to a navigation control device, an audio control device, an electronic toll collection system (ETC, registered trademark) control device and a telephone control device that are examples of the control device 122. The navigation control device, audio control device, ETC control device and telephone control device control a navigation device, an audio device, an ETC device and a mobile phone, respectively.

Moreover, not limited to the configuration where the bus 13 is connected to the control device 122, the bus 13 may also be connected to an on-vehicle device other than the control device 122, e.g., a sensor.

The gateway device 151 is, for example, a central gateway (CGW), and is capable of communicating with an on-vehicle device.

The gateway device 151, for example, performs relay processing that relays information exchanged between the control devices 122 connected to different buses 13 in a target vehicle, information exchanged between the on-vehicle communication machines 111, and information exchanged between the control device 122 and the on-vehicle communication machine 111.

More specifically, in a target vehicle, messages are periodically transmitted from an on-vehicle device to another on-vehicle device in accordance with a prescribed rule. While this example describes messages periodically transmitted from one control device 122 to another control device 122, same applies to messages transmitted between the control device 122 and the on-vehicle communication machine 111 or messages transmitted between the on-vehicle communication machines 111.

A message may be transmitted through either broadcast or unicast. In the description below, a message transmitted periodically will also be referred to as a periodic message.

Moreover, in a target vehicle, in addition to the periodic message, an event message is also present that is transmitted irregularly from one control device 122 to another control device 122. The event message is used to transmit information related to, for example, door lock, battery, fuel, air conditioner operation, seat belt, driving assistance, illumination, meter display and window operation.

A message includes an ID for identifying the content of the message, a transmission source and so forth. Whether a message is a periodic message or an event message may be identified by an ID.

Figure 3:
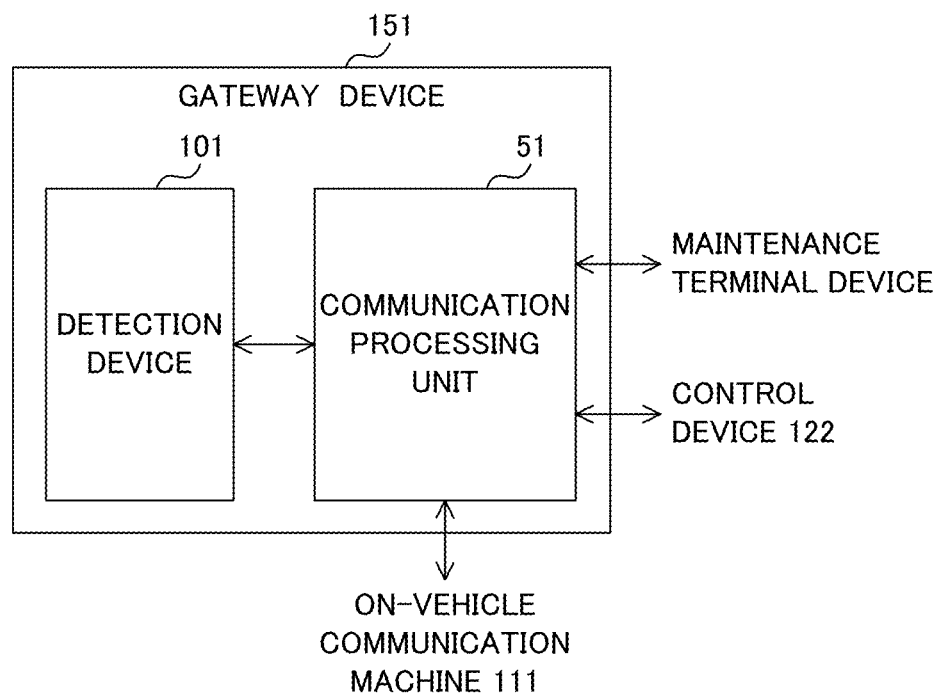
FIG. 3 illustrates the configuration of a gateway device in an on-vehicle detection system according to an embodiment of the present invention.

FIG. 3 illustrates the configuration of a gateway device in an on-vehicle detection system according to an embodiment of the present invention.

Referring to FIG. 3, the gateway device 151 includes a communication processing unit 51 and a detection device 101.

The communication processing unit 51 in the gateway device 151 performs relay processing. More specifically, upon reception of a message via a corresponding bus from one on-vehicle device, the communication processing unit 51 transmits the received message to another on-vehicle device via a corresponding bus.

Figure 4:
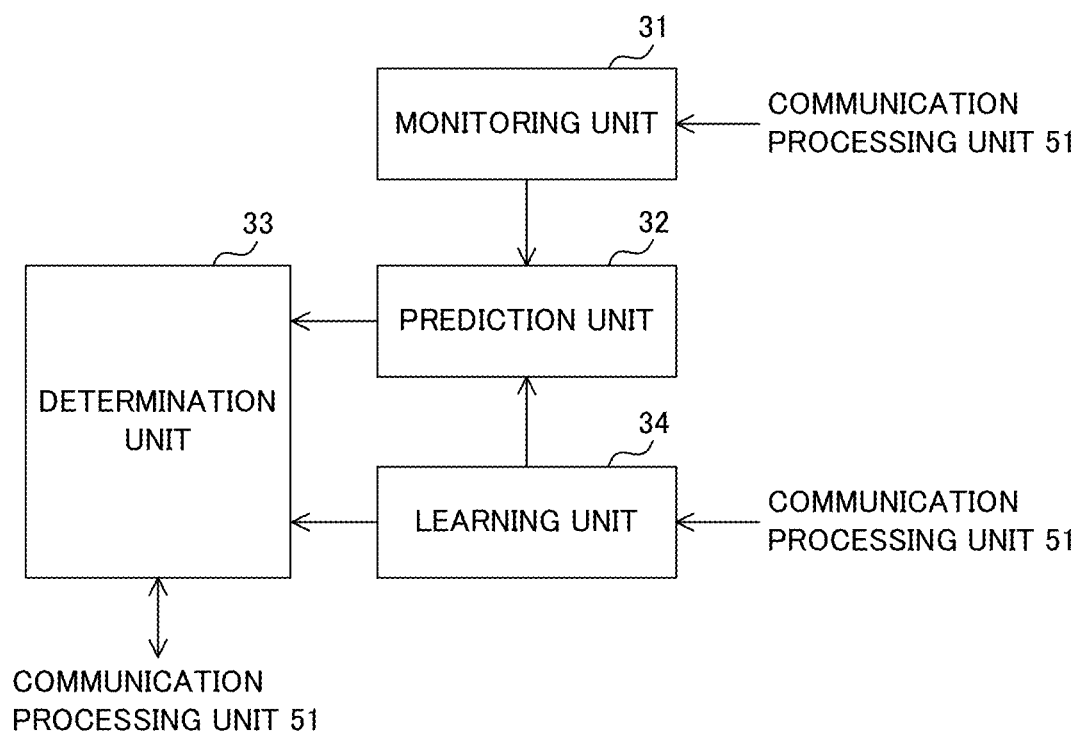
FIG. 4 illustrates the configuration of a detection device in a gateway device according to an embodiment of the present invention.

FIG. 4 illustrates the configuration of a detection device in a gateway device according to an embodiment of the present invention.

Referring to FIG. 4, the detection device 101 includes a monitoring unit 31, a prediction unit 32, a determination unit 33 and a learning unit 34.

The detection device 101 detects unauthorized communication in the on-vehicle network 12.

The learning unit 34 in the detection device 101 creates determination reference information based on the history of the first information indicating a state or control concerning a target vehicle and transmitted in the on-vehicle network 12. The first information occurs, for example, upon transmission of the second information indicating control concerning a target vehicle and transmitted in the on-vehicle network 12.

Specifically, the learning unit 34 specifies information having correlation among multiple pieces of information transmitted in the on-vehicle network 12 using a machine learning method such as a support vector machine (SVM), for example.

More specifically, the learning unit 34 specifies, for example, the first information and the second information having different causes of occurrence. In particular, the learning unit 34 specifies the second information based on a behavior associated with an action intentionally performed by a target person (hereinafter also referred to as an intentional behavior), and the first information based on a behavior accompanying the intentional behavior (hereinafter also referred to as an accompanying behavior).

Figure 5:
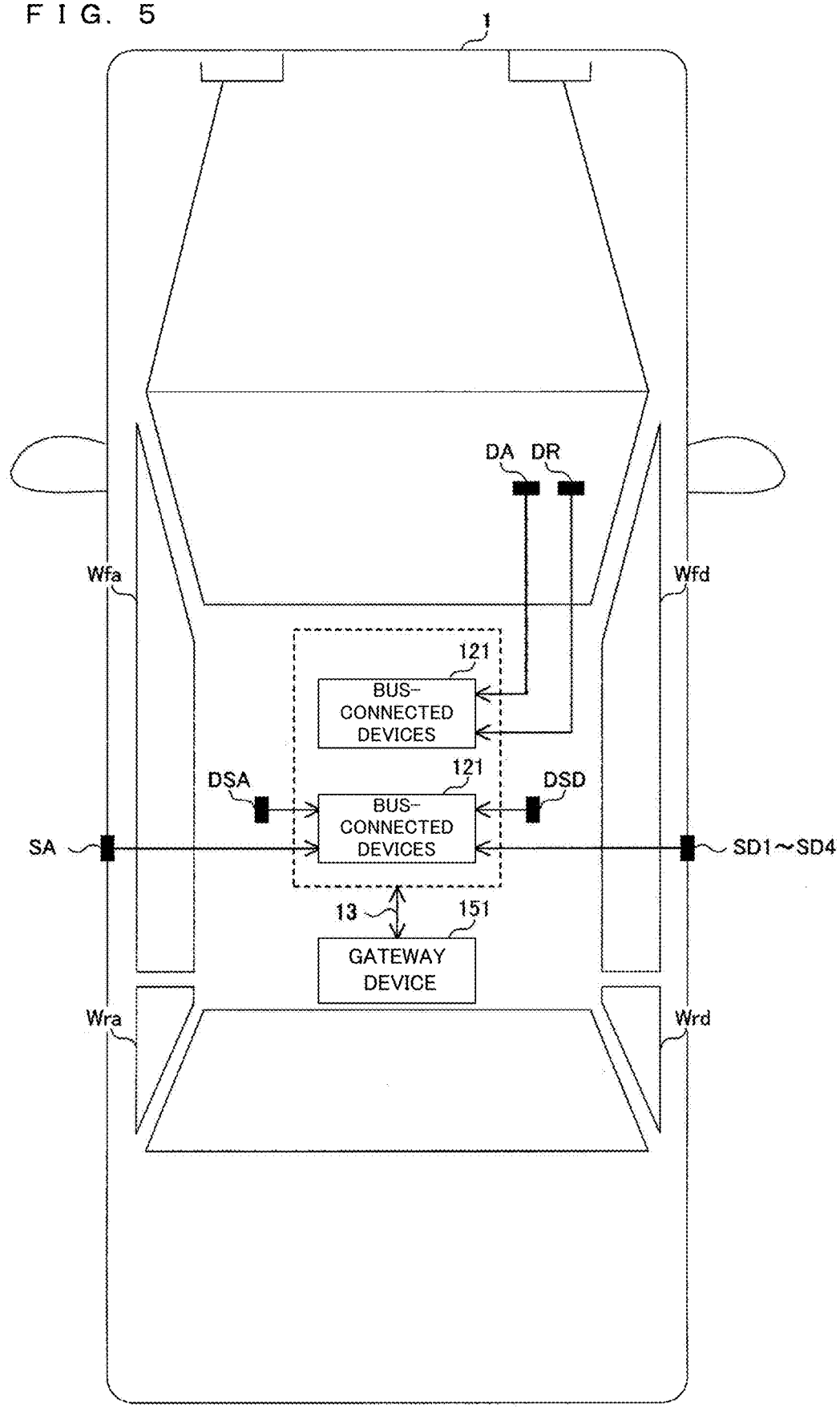
FIG. 5 is a view for illustrating an example of power window operation in a target vehicle according to an embodiment of the present invention.

FIG. 5 is a view for illustrating an example of power window operation in a target vehicle according to an embodiment of the present invention.

Referring to FIG. 5, for example, the target vehicle 1 is provided with windows Wfd, Wfa, Wra and Wrd that can be opened and closed at a driver seat, an assistant driver seat, a rear seat on the assistant driver side and a rear seat on the driver side, respectively.

Provided near the driver seat are power window switches SD1 to SD4 for opening and closing the windows Wfd, Wfa, Wra and Wrd, respectively. Further provided near the assistant driver seat is a power window switch SA for opening and closing the window Wfa.

In the case where, for example, an intentional behavior IB1 associated with the operation of the power window switches SD1 to SD4 by the driver occurs, an accompanying behavior as described below occurs.

That is, an accompanying behavior AB1 in which the driver releases the steering, an accompanying behavior AB2 in which the driver's eyes are turned toward a switch by the driver becoming conscious of the switch, and an accompanying behavior AB3 in which the driver moves his/her body on the driver seat occur.

When the accompanying behavior AB1 occurs, the rotation angle of steering changes, for example. When the accompanying behavior AB2 occurs, the position of the accelerator changes, for example. When the accompanying behavior AB3 occurs, the distribution of the load of the driver in the driver seat changes, for example.

Moreover, in the case where, for example, an intentional behavior IB4 associated with the operation of the power window switch SA by a target person on the assistant driver seat occurs, an accompanying behavior AB4 or the like occurs in which the target person moves his/her body on the assistant driver seat.

The learning unit 34, for example, monitors the content of information transmitted in the on-vehicle network 12, and specifies the first information and second information based on the result of monitoring. Here, the first information and second information are correlated with each other, for example.

Specifically, the learning unit 34 specifies message groups Gc1, Gc2 and Gc3 as one example of the first information, and a message Me1 which is an event message as one example of the second information.

The message groups and the event message are transmitted to the gateway device 151 via the bus-connected devices 121 and the bus 13, for example, and relayed by the gateway device 151. The group of messages and the event message may also be, for example, transmitted directly to the gateway device 151 via the bus 13 and relayed by the gateway device 151.

The message group Gc1 corresponds to, for example, messages including a change in time series (hereinafter also referred to as a time series change Ref1) of a measurement value of the rotation angle of steering based on the accompanying behavior AB1 among multiple messages transmitted from a steering rotation angle sensor DR located at the steering.

The message group Gc2 corresponds to, for example, messages including a change in time series (hereinafter also referred to as a time series change Ref2) of a measurement value of the accelerator position based on the accompanying behavior AB2 among multiple messages transmitted from an accelerator position sensor DA located at the accelerator pedal.

The message group Gc3 corresponds to, for example, messages including a change in time series (hereinafter also referred to as a time series change Ref3) of a measurement value of the seat load at the driver seat based on the accompanying behavior AB3 among multiple messages transmitted from a seat load sensor DSD at the driver seat.

The message Me1 is a message occurring due to the intentional behavior IB1. Specifically, the message Me1 is a message for controlling the opening and closing of at least one of the windows Wfd, Wfa, Wra and Wrd that is correlated with the message groups Gc1, Gc2 and Gc3, for example.

Moreover, the learning unit 34 specifies the message group Gc4 as one example of the first information, and a message Me4 which is an event message as one example of the second information.

The message group Gc4 corresponds to a group of messages including a change in time series (hereinafter also referred to as Ref4) of the measurement value of the seat load in the assistant driver seat based on the accompanying behavior AB4 among multiple messages transmitted from the seat load sensor DSA in the assistant driver seat.

The message Me4 is a message occurring due to the intentional behavior IB4. Specifically, the message Me4 is a message for controlling the opening and closing of the window Wfa that is correlated with the message group Gc4, for example.

The learning unit 34 creates determination reference information including accompanying behavior information for detecting the accompanying behavior of a target person and intentional behavior information for detecting the intentional behavior of the target person.

Specifically, the learning unit 34 creates determination reference information DSi1 including the accompanying behavior information ABi1 and intentional behavior information IBi1.

The accompanying behavior information ABi1 indicates time series changes Ref1 to Ref3 as well as IDs (hereinafter also referred to as IDc1 to IDc3) of message groups Gc1 to Gc3. The intentional behavior information IBi1 indicates a relative expected period and an ID (hereinafter also referred to as IDe1) of the message Me1. Here, the relative expected period is a period during which the occurrence of an intentional behavior is expected in the case where the timing when an accompanying behavior occurs is set as a reference.

In this example, the period during which the occurrence of an intentional behavior is expected is a period chronologically after the timing when an accompanying behavior occurs. Note that the period during which the occurrence of an intentional behavior is expected may also be a period chronologically before the timing when an accompanying behavior occurs.

Moreover, the learning unit 34 creates determination reference information DSi4 including the accompanying behavior information ABi4 and intentional behavior information IBi4.

The accompanying behavior information ABi4 indicates the time series change Ref4 and an ID (hereinafter also referred to as IDc4) of the message group Gc4. The intentional behavior information IBi4 indicates a relative expected period and an ID (hereinafter also referred to as IDe4) of the message Me4.

The learning unit 34 outputs the created determination reference information DSi1 and DSi4 to the prediction unit 32. Moreover, the learning unit 34 notifies the determination unit 33 of the IDs, i.e. IDe1 and IDe4, of the messages indicated by the intentional behavior information IBi1 and IBi4.

Upon reception of the determination reference information Dsi1 and Dsi4 from the learning unit 34, the prediction unit 32 obtains IDc1 to IDc4 from the received determination reference information DSi1 and DSi4, and registers the obtained IDc1 to IDc4 in the monitoring unit 31 as monitoring target IDs.

The monitoring unit 31 monitors the first information transmitted in the on-vehicle network 12. More specifically, the monitoring unit 31 monitors, for example, an ID contained in the message relayed by the communication processing unit 51.

The monitoring unit 31 monitors, for example, multiple kinds of first information. Specifically, in the case where a message having the same ID as the monitoring target ID registered by the prediction unit 32 is relayed by the communication processing unit 51, the monitoring unit 31 obtains a copy of the message from the communication processing unit 51, and outputs the obtained message to the prediction unit 32.

The prediction unit 32 predicts the occurrence of the second information based on the first information monitored by the monitoring unit 31.

More specifically, the prediction unit 32 predicts the second information based on the determination reference information and the first information monitored by the monitoring unit 31. The prediction unit 32 predicts, for example, the occurrence of the second information based on the content of the first information monitored by the monitoring unit 31.

Specifically, the prediction unit 32 predicts, for example, the occurrence of the message Me1 based on the determination reference information DSi1 as well as the content of the message obtained by the monitoring unit 31, i.e. the message having any one of the IDc1 to IDc3. Moreover, the prediction unit 32 predicts, for example, the occurrence of the message Me4 based on the determination reference information DSi4 as well as the content of the message having IDc4.

More specifically, the prediction unit 32 receives messages from the monitoring unit 31 and organizes the received messages based on each ID, to obtain the contents of the messages, i.e., the time series data of the measurement value of the rotation angle of steering, the measurement value of the accelerator position, the measurement value of the seat load in the driver seat and the measurement value of the seat load in the assistant driver seat.

The prediction unit 32, for example, calculates the similarity between the obtained time series data and the time series change indicated by the accompanying behavior information ABi1 contained in the determination reference information DSi1.

Specifically, the prediction unit 32 calculates the degree of similarity between the time series data of the measurement value of the rotation angle of steering and the time series change Ref1, the degree of similarity between the time series data of the measurement value of the accelerator position and the time series change Ref2, and the degree of similarity between the time series data of the measurement value of the seat load in the driver seat and the time series change Ref3.

If each degree of similarity satisfies a predetermined condition C1, the prediction unit 32 determines that the accompanying behaviors AB1 to AB3 have occurred. Here, the predetermined condition C1 is a condition in which each degree of similarity is equal to or larger than a corresponding threshold.

If it is determined that the accompanying behaviors AB1 to AB3 have occurred, the prediction unit 32 determines that the intentional behavior B1 highly likely occurs, and performs the processing as described below. That is, the prediction unit 32 calculates an absolute expected period AP1 during which the message having IDe1 occurs based on the timing when the accompanying behaviors AB1 to AB3 occur as well as the relative expected period indicated by the intentional behavior information IBi1 contained in the determination reference information DSi1, and notifies the determination unit 33 of the IDe1 and the absolute expected period AP1.

Moreover, the prediction unit 32 calculates, for example, the degree of similarity between the time series data of the measurement value of the seat load in the assistant driver seat and the time series change Ref4.

If each degree of similarity satisfies the predetermined condition C4, the prediction unit 32 determines that the accompanying behavior AB4 occurs. Here, the predetermined condition C4 is a condition in which the degree of similarity is equal to or larger than a corresponding threshold.

If it is determined that the accompanying behavior AB4 occurs, the prediction unit 32 determines that the intentional behavior IB4 highly likely occurs, and performs the processing as described below. That is, the prediction unit 32 calculates an absolute expected period AP4 indicating absolute time during which the message having IDe4 occurs based on the timing when the accompanying behavior AB4 occurs as well as the relative expected period indicated by the intentional behavior information IBi4 contained in the determination reference information DSi4, and notifies the determination unit 33 of the IDe4 and the absolute expected period AP4.

In the case where the second information is transmitted in the on-vehicle network 12, the determination unit 33 determines whether or not the transmitted second information is unauthorized based on the result of prediction performed by the prediction unit 32.

More specifically, the determination unit 33 uses the prediction result based on the multiple types of first information monitored by the monitoring unit 31 to determine if one kind of second information is unauthorized.

Specifically, the determination unit 33 uses the absolute expected period AP1 based on the message groups Gc1 to Gc3 monitored by the monitoring unit 31 to determine if the message Me1 is unauthorized.

More specifically, upon reception of the notification of IDe1 and IDe4 from the learning unit 34, the determination unit 33 monitors relay processing in the communication processing unit 51 for a message having either one of IDe1 and IDe4 (hereinafter also referred to as a target message).

In the case where relay processing for a target message is performed in the communication processing unit 51, the determination unit 33 determines whether or not the target message is unauthorized.

More specifically, if, for example, the target message having IDe1 is relayed from the prediction unit 32 in the absolute expected period AP1 notified together with IDe1, the determination unit 33 determines that the target message is authorized.

If, on the other hand, relay processing for a target message having IDe1 is performed in a period different from the absolute expected period AP1, the determination unit 33 determines that the target message is unauthorized.

More specifically, the determination unit 33 uses, for example, the prediction result based on one kind of first information monitored by the monitoring unit 31 to determine if one kind of second information is unauthorized.

Specifically, the determination unit 33 uses the absolute expected period AP4 based on the message group Gc4 monitored by the monitoring unit 31 to determine if the message Me4 is unauthorized.

More specifically, if, for example, the target message having IDe4 is relayed from the prediction unit 32 in the absolute expected period AP4 notified together with IDe4, the determination unit 33 determines that the target message is authorized.

In the case where relay processing for a target message having IDe4 is performed in a period different from the absolute expected period AP4, the determination unit 33 determines that the target message is unauthorized.

If it is determined that the target message is unauthorized, the determination unit 33, for example, creates unauthorized message information, and transmits the created unauthorized message information to a smartphone and an instrument display control device held by a target person via the communication processing unit 51.

Variation Example 1

Figure 6:
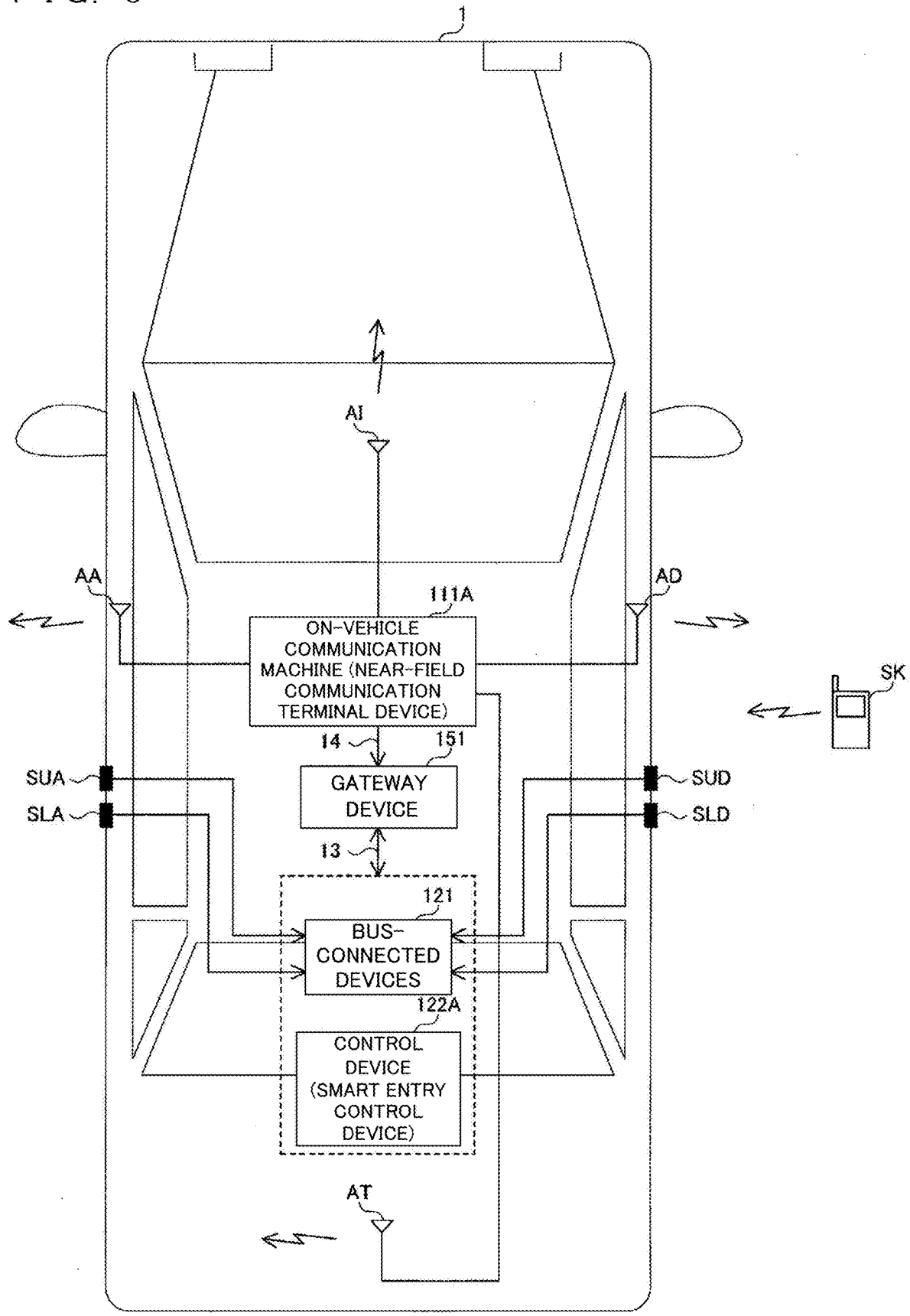
FIG. 6 is a view for illustrating an example of smart entry for a target vehicle according to an embodiment of the present invention.

FIG. 6 illustrates an example of smart entry in a target vehicle according to an embodiment of the present invention.

Referring to FIG. 6, the target vehicle 1 is provided with antennas AD, AA, AT and AI for transmitting LF signals in the LF band, located at the door on the driver side, the door of the assistant driver side, the trunk and the inside of the vehicle, respectively. An unlock switch SUD and a lock switch SLD are also located at the door on the driver side. An unlock switch SUA and a lock switch SLA are located at the door on the assistant driver side.

The NFC terminal device 111A which is an on-vehicle communication machine 111, for example, transmits LF signals from the antennas AD, AA, AT and AI.

More specifically, the NFC terminal device 111A, for example, intermittently transmits LF signals containing the identifier of an antenna to be used for transmission (hereinafter also referred to as a transmission source identifier).

The transmission periods for these LF signals are, for example, not overlapped with each other.

(1. At the Time of Unlocking)

In a situation where the driver who holds the smart key SK approaches the door on the driver side from the outside of the vehicle, when intermittently receiving LF signals from the NFC terminal device 111A, the smart key SK measures the received signal strength indicator (RSSI) of each of the received LF signals. The smart key SK then transmits the measured RSSI and a radio frequency (RF) signal in the UHF band containing the transmission source identifier included in the LF signal to the target vehicle 1.

When receiving an RF signal from the smart key SK, the NFC terminal device 111A obtains RSSI and a transmission source identifier from the received RF signal and, for example, periodically transmits the message Mc5 containing the obtained RSSI and transmission source identifier to a smart entry control device 122A which is a control device 122 via the gateway device 151.

The smart entry control device 122A receives the message Mc5 from the NFC terminal device 111A, and obtains RSSI for each transmission source identifier by aggregating the contents of the message Mc5.

The smart entry control device 122A calculates the position of the smart key SK, i.e. the driver, relative to the target vehicle 1 based on the obtained RSSI for each transmission source identifier.

In this example, the smart entry control device 122A derives the position of the driver when the driver is outside the door on the driver side.

When the driver operates the unlock switch SUD at the door on the driver side, the message Me5 indicating the operation result is transmitted to the smart entry control device 122A, for example, after being relayed in the gateway device 151 via the bus-connected devices 121 and the bus 13. Note that the message Me5 may, for example, be directly transmitted to the smart entry control device 122A and the gateway device 151 via the bus 13.

When receiving the message Me5, the smart entry control device 122A performs control for unlocking the door on the driver side.

(2. At the Time of Locking)

In a situation where the driver holding the smart key SK exits the car from the driver seat, the smart entry control device 122A receives the message Mc5 from the NFC terminal device 111A via the gateway device 151, and obtains RSSI for each transmission source identifier from the received message Mc5.

The smart entry control device 122A derives that the driver positioned on the driver side has moved to the outside the door on the driver side based on the obtained RSSI for each transmission source identifier.

When the driver operates the lock switch SLD at the door on the driver side, the message Me6 indicating the operation result is transmitted to the smart entry control device 122A, for example, after being relayed in the gateway device 151 via the bus-connected devices 121 and the bus 13. Note that the message Me6 may, for example, be directly transmitted to the smart entry control device 122A and the gateway device 151 via the bus 13.

When receiving the message Me6, the smart entry control device 122A performs control for locking the door on the driver side.

Referring again to FIG. 4, in the case where, for example, an intentional behavior IB5 associated with the operation of the unlock switch SUD by the driver occurs, an accompanying behavior as described below occurs.

That is, an accompanying behavior AB5 or the like occurs that stops the driver from moving at the outside of the door on the driver side for a certain period of time.

When the accompanying behavior AB5 occurs, for example, the RSSI of the LF signals measured by the smart key SK is stabilized for a certain period of time.

Moreover, in the case where, for example, an intentional behavior IB6 associated with the operation of the lock switch SLD by the driver occurs for locking the door on the driver side, an accompanying behavior as described below occurs.

That is, after the driver positioned at the driver seat moves to the outside the door on the driver side, the accompanying behavior AB6 occurs that stops movement at the outside of the door for a certain period of time.

When the accompanying behavior AB6 occurs, for example, the RSSI of the LF signals measured by the smart key SK is stabilized for a certain period of time after variation associated with the movement of the driver occurs.

The learning unit 34 specifies the message group Gc5 as one example of the first information, and a message Me5 which is an event message as one example of the second information.

The message group Gc5 corresponds to, for example, multiple messages containing a time series change (hereinafter also referred to as time series change Ref5) of RSSI for each transmission source identifier based on the accompanying behavior AB5 among the multiple messages Mc5 transmitted from the NFC terminal device 111A.

The message Me5 is a message occurring due to the intentional behavior IB5 as described above.

Moreover, the learning unit 34 specifies the message group Gc6 as one example of the first information, and a message Me6 which is an event message as one example of the second information.

The message group Gc6 corresponds to multiple messages including a change in time series of RSSI for each transmission source identifier based on the accompanying behavior AB6 among the multiple messages Mc5 transmitted from the NFC terminal device 111A.

The message Me6 is a message occurring due to the intentional behavior IB6 as described above.

The learning unit 34 creates determination reference information DSi5 including the accompanying behavior information ABi5 and intentional behavior information IBi5.

The accompanying behavior information ABi5 indicates the ID of the message group Gc5 (hereinafter also referred to as IDc5) and the change in time series Ref5. The intentional behavior information IBi5 indicates the relative expected period and the ID of the message Me5 (hereinafter also referred to as IDe5).

Moreover, the learning unit 34 creates determination reference information DSi6 including the accompanying behavior information ABi6 and intentional behavior information IBi6.

The accompanying behavior information ABi6 indicates the ID of the message group Gc6, i.e. IDc6, and the change in time series Ref6. The intentional behavior information IBi6 indicates the relative expected period and the ID of the message Me6 (hereinafter also referred to as IDe6).

The learning unit 34 outputs the created determination reference information DSi5 and DSi6 to the prediction unit 32. Moreover, the learning unit 34 notifies the determination unit 33 of the IDs, i.e. IDe5 and IDe6, of the messages indicated by the intentional behavior information IBi5 and IBi6.

Upon reception of the determination reference information Dsi5 and Dsi6 from the learning unit 34, the prediction unit 32 obtains IDc5 from either one of the received determination reference information DSi5 and DSi6, and registers the obtained IDc5 in the monitoring unit 31 as a monitoring target ID.

As described above, in the case where a message having the same ID as the monitoring target ID registered by the prediction unit 32 is relayed by the communication processing unit 51, the monitoring unit 31 outputs a copy of the message to the prediction unit 32.

The prediction unit 32 receives a message having IDc5, i.e. message Mc5, from the monitoring unit 31 and organizes the received message Mc5, to obtain a change in time series of RSSI for each transmission source identifier.

The prediction unit 32 calculates the degree of similarity between the time series data of RSSI for each transmission source identifier and the time series change Ref5.

If each degree of similarity satisfies the predetermined condition C5, the prediction unit 32 determines that the accompanying behavior AB5 has occurred. Here, the predetermined condition C5 is a condition in which each degree of similarity is equal to or larger than a corresponding threshold.

If it is determined that the accompanying behavior AB5 occurs, the prediction unit 32 determines that the intentional behavior B5 highly likely occurs, and performs the processing as described below. That is, the prediction unit 32 calculates an absolute expected period AP5 during which the message having IDe5 occurs based on the timing when the accompanying behavior AB5 occurs as well as the relative expected period indicated by the intentional behavior information IBi5 contained in the determination reference information DSi5, and notifies the determination unit 33 of the IDe5 and the absolute expected period AP5.

Moreover, the prediction unit 32 calculates the degree of similarity between the time series data of RSSI for each transmission source identifier and the time series change Ref6.

If the degree of similarity satisfies the predetermined condition C6, the prediction unit 32 determines that the accompanying behavior AB6 has occurred. Here, the predetermined condition C6 is a condition in which the degree of similarity is equal to or larger than a corresponding threshold.

If it is determined that the accompanying behavior AB6 has occurred, the prediction unit 32 determines that the intentional behavior IB6 highly likely occurs, and performs the processing as described below. That is, the prediction unit 32 calculates an absolute expected period AP6 during which the message having IDe6 occurs based on the timing when the accompanying behavior AB6 occurs as well as the relative expected period indicated by the intentional behavior information IBi6 contained in the determination reference information DSi6, and notifies the determination unit 33 of the IDe6 and the absolute expected period AP6.

Upon reception of the notification of IDe5 and IDe6 from the learning unit 34, the determination unit 33 monitors relay processing in the communication processing unit 51 for a target message having either one of IDe5 and IDe6.

If, for example, the target message having IDe5 is relayed from the prediction unit 32 in the absolute expected period AP5 notified together with IDe5, the determination unit 33 determines that the target message is authorized.

If, on the other hand, the target message having IDe5 is, for example, relayed in a period different from the absolute expected period AP5, the determination unit 33 determines that the target message is unauthorized.

Likewise, if the target message having IDe6 is, for example, relayed from the prediction unit 32 in the absolute expected period AP6 notified together with IDe6, the determination unit 33 determines that the target message is authorized.

If, on the other hand, the target message having IDe6 is, for example, relayed in a period different from the absolute expected period AP6, the determination unit 33 determines that the target message is unauthorized.

Variation Example 2

Figure 7:
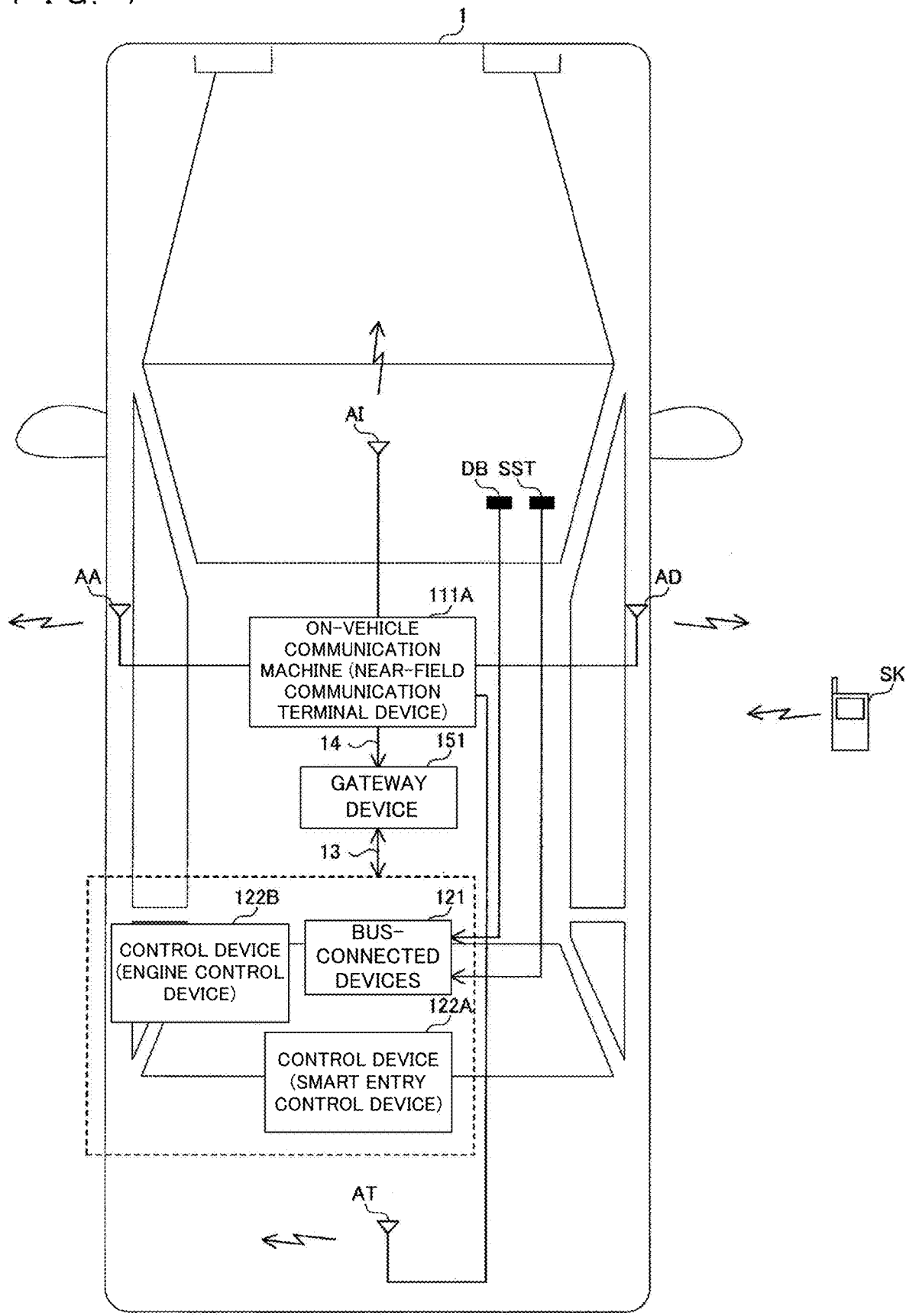
FIG. 7 is a view for illustrating an example of starting a motor using smart entry for a target vehicle according to an embodiment of the present invention.

FIG. 7 is a view for illustrating an example of starting a motor using smart entry for a target vehicle according to an embodiment of the present invention.

Referring to FIG. 7, the target vehicle 1 is provided with a motor start switch SST. In a situation where the driver holding the smart key SK is positioned in the driver seat, the smart entry control device 122A receives the message Mc5 from the NFC terminal device 111A via the gateway device 151, and obtains RSSI for each transmission source identifier from the received message Mc5.

The smart entry control device 122A derives the position of the smart key SK, i.e. the driver, relative to the target vehicle 1 based on the obtained RSSI for each transmission source identifier. In this example, the smart entry control device 122A derives that the driver is positioned in the driver seat.

When the driver operates the motor start switch SST, the message Me7 indicating the operation result is transmitted to the engine control device 122B, for example, after being relayed in the gateway device 151 via the bus-connected devices 121 and the bus 13. Note that the message Me7 may, for example, be directly transmitted to the engine control device 122B and the gateway device 151 via the bus 13.

When receiving the message Me7, the engine control device 122B performs control for starting the engine.

Referring again to FIG. 4, in the case where, for example, an intentional behavior IB7 associated with the operation of the motor start switch SST by the driver occurs for starting the engine in the target vehicle 1, an accompanying behavior as described below occurs.

That is, an accompanying behavior AB7 in which the driver is stopped from moving in the driver seat for a certain period of time, an accompanying behavior AB8 in which the driver steps on the brake pedal, and the like occur.

When the accompanying behavior AB7 occurs, for example, the RSSI of the LF signals measured by the smart key SK, as well as the difference between RSSIs are stabilized. Moreover, when the accompanying behavior AB8 occurs, the intensity of stepping the brake pedal changes.

The learning unit 34 specifies message groups Gc7 and GC8 as one example of the first information, and a message Me1 which is an event message as one example of the second information.

The message group Gc7 corresponds to, for example, messages including the time series change of RSSI for each transmission source identifier based on the accompanying behavior AB7 (hereinafter also referred to as the time series change Ref7) among the multiple messages Mc5 transmitted from the NFC terminal device 111A.

The message group Gc8 corresponds to, for example, messages including the time series change of a measurement value of the brake step-on intensity (hereinafter also referred to as the time series change Ref8) based on the accompanying behavior AB8 among the multiple messages transmitted from a step-on intensity sensor DB located at the brake pedal.

The message Me7 is a message occurring due to the intentional behavior IB7 as described above.

The learning unit 34 creates determination reference information DSi7 including the accompanying behavior information ABi7 and intentional behavior information IBi7.

The accompanying behavior information ABi7 indicates the time series changes Ref7 and Ref8 as well as the ID of the message group Gc7, i.e. IDc7, and the ID of the message group Gc8 (hereinafter also referred to as IDc8). The intentional behavior information IBi7 indicates the relative expected period and the ID of the message Me6 (hereinafter also referred to as IDe7).

The learning unit 34 outputs the created determination reference information Dsi7 to the prediction unit 32. Moreover, the learning unit 34 notifies the determination unit 33 of the ID of the message indicated by the intentional behavior information IBi7, i.e. IDe7.

Upon reception of the determination reference information DSi7 from the learning unit 34, the prediction unit 32 obtains IDc5 and IDc8 from the received determination reference information DSi7, and registers the obtained IDc5 and IDc8 in the monitoring unit 31 as a monitoring target ID.

As described above, in the case where a message having the same ID as the monitoring target ID registered by the prediction unit 32 is relayed by the communication processing unit 51, the monitoring unit 31 outputs a copy of the message to the prediction unit 32.

The prediction unit 32 receives a message having either one of IDc5 and IDc8 from the monitoring unit 31 and organizes the received messages according to each ID, to obtain a change in time series of RSSI for each transmission source identifier and a change in time series of a measurement value of the brake step-on intensity.

The prediction unit 32 calculates the degree of similarity between the time series data of RSSI for each transmission source identifier and the time series change Ref7 as well as the degree of similarity between the time series change of the measurement value of the brake step-on intensity and the time series change Ref8.

If each degree of similarity satisfies a predetermined condition C7, the prediction unit 32 determines that the accompanying behaviors AB7 and AB8 have occurred. Here, the predetermined condition C7 is, for example, a condition in which each degree of similarity is equal to or larger than a corresponding threshold.

If it is determined that the accompanying behaviors AB7 and AB8 have occurred, the prediction unit 32 determines that the intentional behavior IB7 highly likely occurs, and performs the processing as described below. That is, the prediction unit 32 calculates an absolute expected period AP7 during which the message having IDe7 occurs based on the timing when the accompanying behaviors AB7 and AB8 occur as well as the relative expected period indicated by the intentional behavior information IBi7 contained in the determination reference information DSi7, and notifies the determination unit 33 of IDe7 and the absolute expected period AP7.

Upon reception of the notification of IDe7 from the learning unit 34, the determination unit 33 monitors relay processing in the communication processing unit 51 for a target message having IDe7.

If, for example, the target message having IDe7 is relayed from the prediction unit 32 in the absolute expected period AP7 notified together with IDe7, the determination unit 33 determines that the target message is authorized.

If, on the other hand, the target message having IDe7 is, for example, relayed in a period different from the absolute expected period AP7, the determination unit 33 determines that the target message is unauthorized.

Operation

Each device in the on-vehicle detection system 301 is provided with a computer, and an arithmetic processing unit such as a CPU in the computer reads out programs including a part or whole of each step in the sequence diagram or flowchart from a memory (not shown) and executes the respective programs. The programs in the devices may be installed individually from the outside. Each of the programs in the devices is distributed in a state of being stored in a recording medium.

Figure 8:
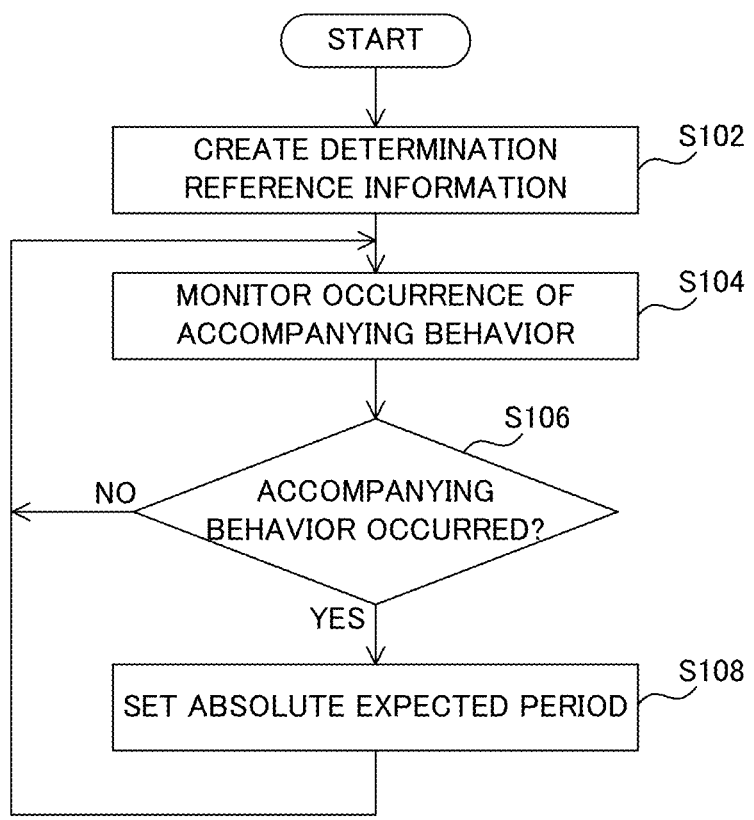
FIG. 8 is a flowchart defining an operation procedure performed when a detection device according to an embodiment of the present invention detects an occurrence of an accompanying behavior.

FIG. 8 is a flowchart defining an operation procedure performed when a detection device according to an embodiment of the present invention detects the occurrence of an associated behavior.

Referring to FIG. 8, first, the detection device 101 creates determination reference information using a message relayed in the gateway device 151 (step S102).

Next, the detection device 101 monitors the occurrence of an accompanying behavior of a target person based on the accompanying behavior information contained in the determination reference information and the content of the message relayed in the gateway device 151 (step S104).

Subsequently, if the occurrence of an accompanying behavior of a target person is detected (YES at step S106), the detection device 101 sets an absolute expected period based on the timing when the accompanying behavior occurs and the intentional behavior information contained in the determination reference information (step S108), and continues monitoring the occurrence of the accompanying behavior of a target person (step S104).

If, on the other hand, the occurrence of an accompanying behavior of a target person is not detected (NO at step S106), the detection device 101 continues monitoring the occurrence of the accompanying behavior of a target person (step S104).

Figure 9:
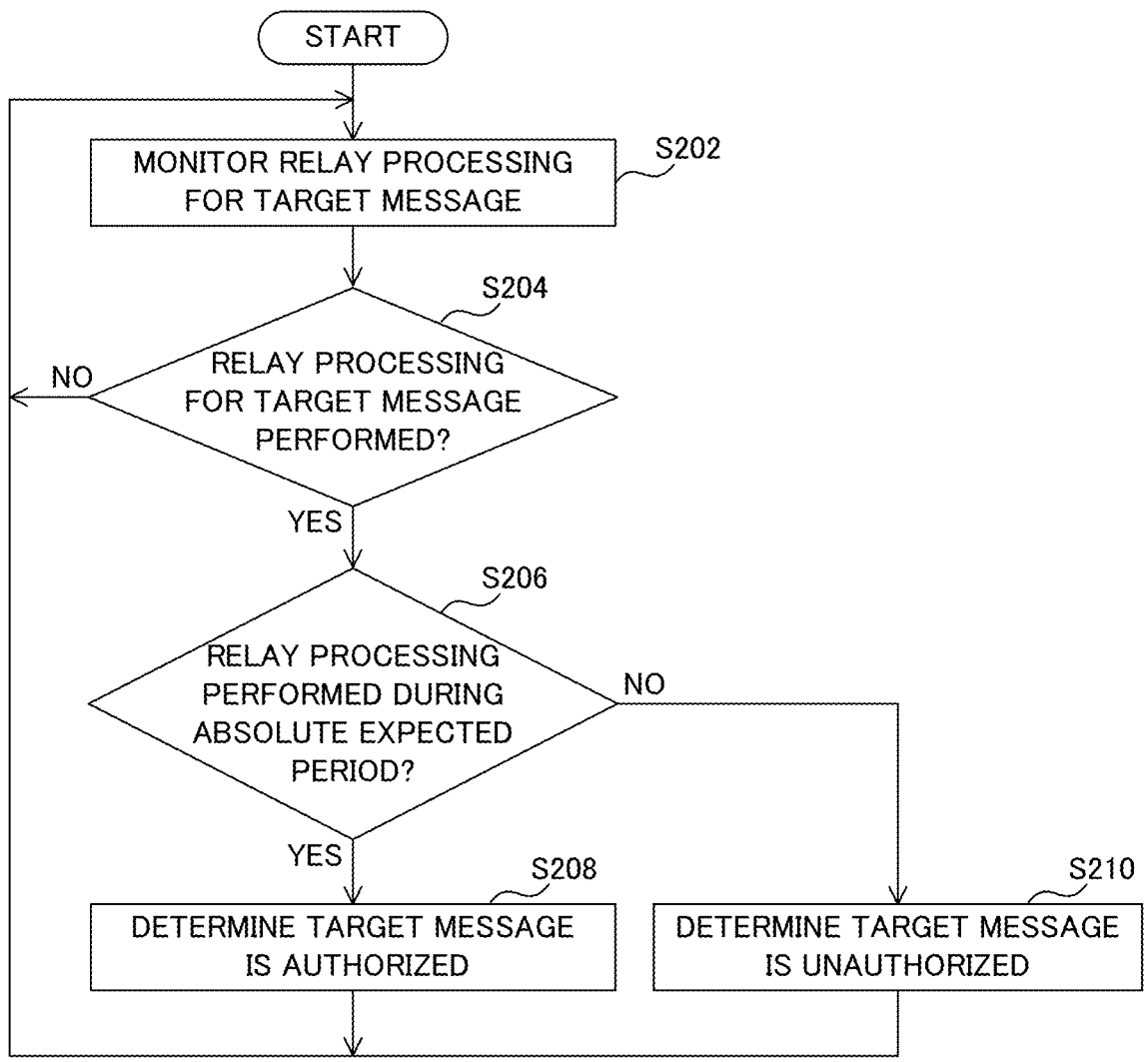
FIG. 9 is a flowchart defining an operation procedure performed when a detection device according to an embodiment of the present invention determines that a target message is unauthorized.

FIG. 9 is a flowchart defining an operation procedure performed when a detection device according to an embodiment of the present invention determines that a target message is unauthorized. It is noted that the detection device 101 independently executes the processing of the flowchart illustrated in each of FIGS. 8 and 9 as different processing.

Referring to FIG. 9, first, the detection device 101 monitors relay processing for a target message in the gateway device 151 (step S202).

Subsequently, if relay processing for the target message is performed in the gateway device 151 (YES at step S204), the detection device 101 confirms whether or not the relay processing for the target message is performed during an absolute expected period (step S206).

If the relay processing for the target message is performed during the absolute expected period (YES at step S206), the detection device 101 determines that the target message is authorized (step S208), and continues monitoring the relay processing for the target message in the gateway device 151 (step S202).

If, on the other hand, the relay processing for the target message is not performed during the absolute expected period (NO at step S206), the detection device 101 determines that the target message is unauthorized (step S210), and continues monitoring the relay processing for the target message in the gateway device 151 (step S202).

Moreover, if the relay processing for the target message is not performed in the gateway device 151 (NO at step S204), the detection device 101 continues monitoring the relay processing for the target message in the gateway device 151 (step S202).

In the on-vehicle detection system according to an embodiment of the present invention, a configuration is employed where the detection device 101 is located inside the gateway device 151, though not limited thereto. The detection device 101 may also be located outside the gateway device 151.

Furthermore, in the on-vehicle detection system according to an embodiment of the present invention, the second information represents control related to a target vehicle, though not limited thereto. The second information may also represent a state related to a target vehicle. More specifically, the second information is, for example, information indicating the state of unsteady driving, excessive speed or the like of a target vehicle, and is used for driving assistance. The occurrence of information representing unsteady driving is predicted based on, for example, the acceleration of a target vehicle, the rotation angle of steering in the target vehicle, and a change in time series of the accelerator position in the target vehicle. Moreover, the occurrence of information representing excessive speed is predicted based on, for example, the acceleration of a target vehicle and a change in time series of the accelerator position in the target vehicle.

Furthermore, in the on-vehicle detection system according to an embodiment of the present invention, the first information and second information are described to have different causes of occurrence, though not limited thereto. The first information and the second information may have the same cause of occurrence.

Furthermore, in the on-vehicle detection system according to an embodiment of the present invention, the prediction unit 32 is configured to predict the occurrence of the second information based on the determination reference information and the first information, though not limited thereto. The prediction unit 32 may also be configured to predict the occurrence of the second information without the use of determination reference information. Specifically, in the case where, for example, the transmission of information in the on-vehicle network 12 is in accordance with such a protocol that the second information is transmitted after a predetermined time elapses from the transmission of the first information, the prediction unit 32 may predict the occurrence of the second information based on the occurrence of the first information.

Furthermore, in the on-vehicle detection system according to an embodiment of the present invention, the prediction unit 32 is configured to predict the occurrence of the second information based on the content of the first information, though not limited thereto. The prediction unit 32 may also be configured to predict the occurrence of the second information based on the presence/absence of transmission of the first information instead of the content of the first information.

Furthermore, in the on-vehicle detection system according to an embodiment of the present invention, the gateway device 151 including a detection device is directly connected to the bus 13, though not limited thereto.

Figure 10:
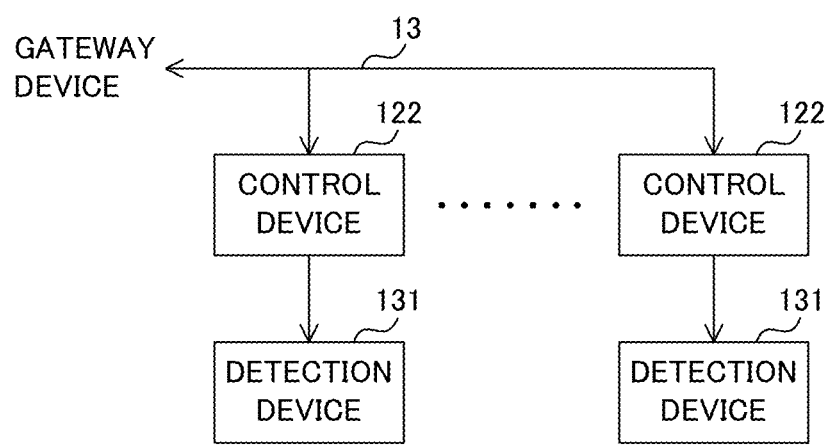
FIG. 10 illustrates an example of connection topology for an on-vehicle network according to an embodiment of the present invention.

FIG. 10 illustrates an example of connection topology for an on-vehicle network according to an embodiment of the present invention.

Referring to FIG. 10, the detection device 131 may also be configured to be connected to the bus 13 via an on-vehicle device, e.g., the control device 122. Here, the detection device 131 monitors a target message transmitted and received by the on-vehicle device, for example, to detect an unauthorized message transmitted to the bus 13.

Meanwhile, Japanese Patent Application Laid-Open Publication No. 2016-116075 discloses a configuration for preventing cyberattack from an out-of-vehicle network to the first ECU and the second ECU not connected to an out-of-vehicle network by differentiating a first cypher key used in message authentication by the first ECU and the second ECU connected only within an on-vehicle network from a second cypher key used by the third ECU connected to both the on-vehicle network and out-of-vehicle network.

The security measures using message authentication may, however, be disabled by an attack to vulnerable protocols, attack by illicit acquisition of the first cypher key, attack to obsolescent cryptographic algorithms, and so forth.

In such a case, a technology has been desired for correctly detecting that an attacker has intruded into the on-vehicle network.

To address this, the detection device according to an embodiment of the present invention detects unauthorized communication in the on-vehicle network 12 mounted to a target vehicle. The monitoring unit 31 monitors the first information transmitted in the on-vehicle network 12, which indicates the state or control related to a target vehicle. The prediction unit 32 predicts the occurrence of the second information in the on-vehicle network 12 that indicates the state or control related to a target vehicle, based on the first information monitored by the monitoring unit 31. In the case where the second information is transmitted in the on-vehicle network 12, the determination unit 33 determines whether or not the transmitted second information is unauthorized based on the result of prediction performed by the prediction unit 32.

Accordingly, the configuration where the occurrence of the second information is predicted based on the first information in the on-vehicle network 12 may obtain a period during which the second information highly likely occurs, which allows for determination on the second information occurring in a period different from the above-described period as unauthorized. This can correctly detect unauthorized communication in the on-vehicle network.

Furthermore, in the detection device according to an embodiment of the present invention, the first information and second information have different causes of occurrence.

According to such a configuration, the number of combinations of the first information and the second information may be increased compared to the case where the first information and the second information have the same cause of occurrence, which can enhance the extractability of the combination of the first and second information more suitable to the detection of unauthorized communication.

Furthermore, in the detection device according to an embodiment of the present invention, the monitoring unit 31 monitors multiple kinds of first information. The determination unit 33 then uses the prediction result based on the multiple types of first information monitored by the monitoring unit 31 to determine if one kind of second information is unauthorized.

Such a configuration can enhance the accuracy in prediction of an occurrence of the second information, since the occurrence of the second information may be predicated, for example, based on the result of sensing the behavior of the user or a vehicle in various ways.

Moreover, in the detection device according to an embodiment of the present invention, the prediction unit 32 predicts the occurrence of the second information on the basis of determination reference information created based on the history of the first information occurring when the second information is transmitted in the on-vehicle network 12 and of the first information monitored by the monitoring unit 31.

Such a configuration can enhance the accuracy in prediction of the occurrence of the second information because the occurrence of the second information is predictable from a change in time series of the first information.

Moreover, in the detection device according to an embodiment of the present invention, the prediction unit 32 predicts the occurrence of the second information based on the content of the first information monitored by the monitoring unit 31.

Such a configuration can enhance the accuracy in prediction of the occurrence of the second information because the occurrence of the second information in correlation to a behavior of the user or vehicle represented by the first information may be predicted based on the details of the behavior.

It should be understood that the embodiments described above are construed as illustrative and non-restrictive in every respect. Since the scope of the present invention is defined by the appended claims rather than by the description preceding them, all changes that fall within metes and bounds of the claims, or equivalence of such metes and bounds thereof are therefore intended to be embraced by the claims.

The foregoing description encompasses the characteristics noted in the following clause.

1. A detection device that detects unauthorized communication in an on-vehicle network mounted to a vehicle, comprising:

a monitoring unit that monitors first information transmitted in the on-vehicle network, the first information indicating a state or control related to the vehicle;

a prediction unit that predicts an occurrence of second information in the on-vehicle network, the second information indicating a state or control related to the vehicle, based on the first information monitored by the monitoring unit; and a determination unit that determines, in a case where the second information is transmitted in the on-vehicle network, whether or not the second information transmitted is unauthorized, based on a result of prediction performed by the prediction unit, wherein the prediction unit predicts an occurrence of information indicating a result of operation of a power window switch located near a driver seat of the vehicle, based on information indicating a rotation angle of steering in the vehicle, information indicating an accelerator position in the vehicle, and information indicating a seat load of a driver seat in the vehicle, the prediction unit predicts an occurrence of information indicating a result of operation of the power window switch located near an assistant driver seat of the vehicle, based on the information indicating the seat load of the assistant driver seat in the vehicle, the prediction unit predicts an occurrence of information indicating a result of operation of an unlock switch or a lock switch located at a door of the vehicle, based on the information indicating each reception intensity in a smart key for radio waves transmitted from a plurality of antennas located in the vehicle, and the prediction unit predicts an occurrence of information indicating a result of operation of a motor start switch located in the vehicle, based on the information indicating the reception intensity and information indicating step-on intensity of a brake pedal in the vehicle.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A detection device that detects unauthorized communication in an on-vehicle network mounted to a vehicle, comprising:
    a monitoring unit that monitors first information transmitted in the on-vehicle network, the first information indicating a state or control related to the vehicle;
    a prediction unit that predicts an occurrence of second information in the on-vehicle network, the second information indicating a state or control related to the vehicle, based on the first information monitored by the monitoring unit; and
    a determination unit that determines, in a case where the second information predicted by the prediction unit is transmitted in the on-vehicle network, whether or not the second information transmitted results from unauthorized communication, based on a result of prediction performed by the prediction unit.

2. The detection device according to claim 1, wherein the first information and the second information have causes of occurrence different from each other.

3. The detection device according to claim 1, wherein
    the monitoring unit monitors a plurality of kinds of the first information, and
    the determination unit uses the result of prediction based on the plurality of kinds of the first information monitored by the monitoring unit to determine if one kind of the second information is unauthorized.

4. The detection device according to claim 1, wherein
    the prediction unit predicts an occurrence of the second information on a basis of determination reference information created based on a history of the first information occurring when the second information is transmitted in the on-vehicle network and of the first information monitored by the monitoring unit.

5. The detection device according to claim 1, wherein
    the prediction unit predicts an occurrence of the second information based on a content of the first information monitored by the monitoring unit.

6. The detection device according to claim 1, wherein
    the prediction unit calculates an absolute expected period during which the second information transmitted irregularly occurs based on the content of the first information monitored by the monitoring unit, and
    the determination unit determines that the second information transmitted is due to unauthorized communication when the second information is transmitted in the on-vehicle network during the period other than the absolute expected period.

7. The detection device according to claim 1, wherein
the prediction unit calculates a relative expected period based on the history of the first information occurred when the second information is transmitted in the on-vehicle network, and calculates an absolute expected period during which the second information transmitted irregularly occurs based on the calculated relative expected period and the content of the first information monitored by the monitoring unit.

8. A detection method employed in a detection device that detects unauthorized communication in an on-vehicle network mounted to a vehicle, comprising the steps of:
monitoring first information transmitted in the on-vehicle network, the first information indicating a state or control related to the vehicle;
predicting an occurrence of second information in the on-vehicle network, the second information indicating a state or control related to the vehicle, based on the first information monitored; and
determining, in a case where the second information is transmitted in the on-vehicle network, whether or not the second information transmitted results from unauthorized communication, based on a result of prediction.

9. A computer readable non-transitory recording medium recording a detection program used in a detection device that detects unauthorized communication in an on-vehicle network mounted to a vehicle, the detection program causing a computer to function as:
a monitoring unit that monitors first information transmitted in the on-vehicle network, the first information indicating a state or control related to the vehicle;
a prediction unit that predicts an occurrence of second information in the on-vehicle network, the second information indicating a state or control related to the vehicle, based on the first information monitored by the monitoring unit; and
a determination unit that determines, in a case where the second information predicted by the prediction unit is transmitted in the on-vehicle network, whether or not the second information transmitted results from unauthorized communication, based on a result of prediction performed by the prediction unit.

* * * * *